UNITED STATES PATENT OFFICE.

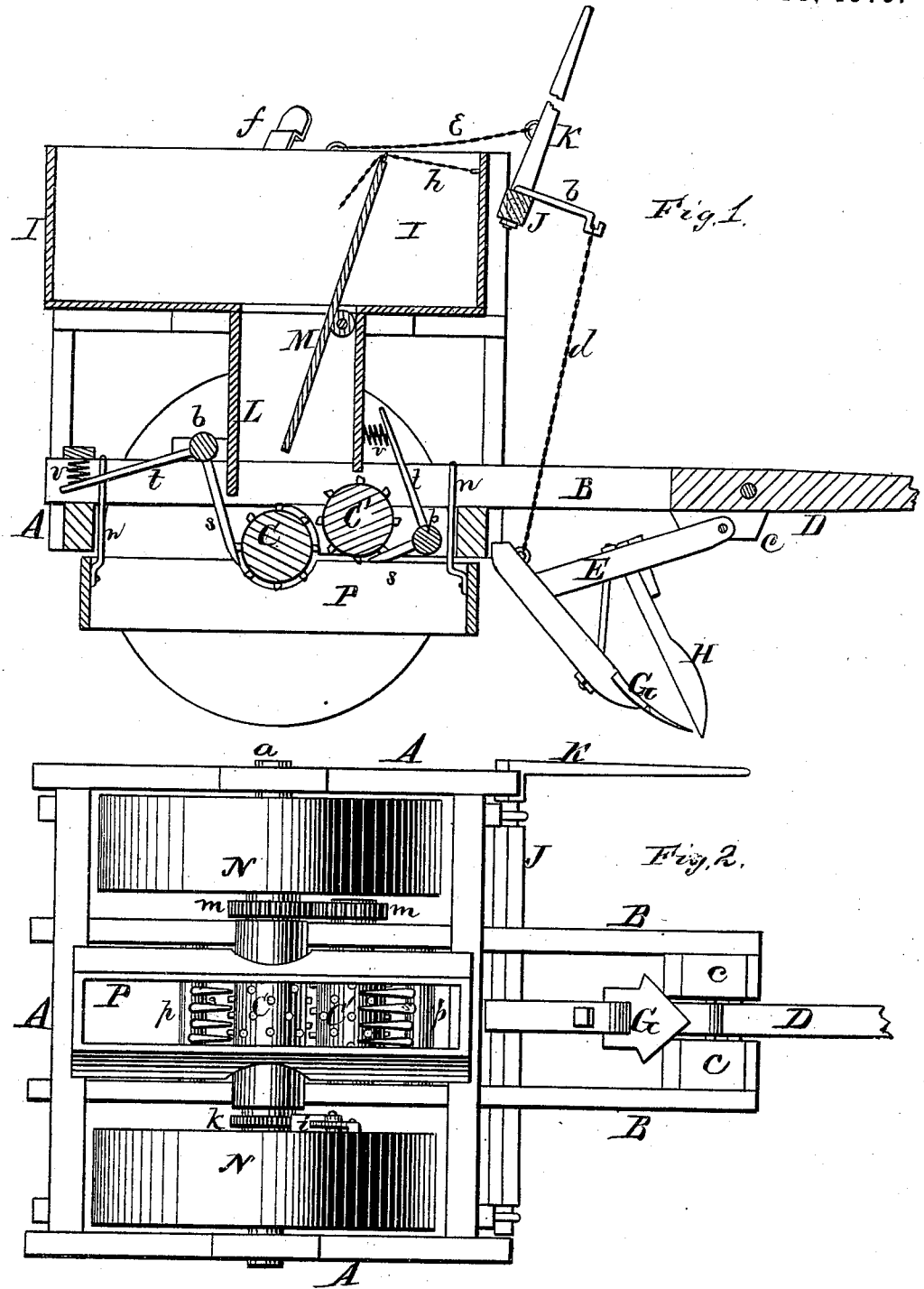

JOHN B. HENRY, OF PUTNAM COUNTY, INDIANA.

IMPROVEMENT IN FERTILIZER-DISTRIBUTERS.

Specification forming part of Letters Patent No. 174,816, dated March 14, 1876; application filed February 12, 1876.

*To all whom it may concern:*

Be it known that I, JOHN B. HENRY, of Putnam county, Indiana, (post-office address, Ashby's Mills, in the county of Montgomery and State of Indiana,) have invented a new and valuable Improvement in Manure and Fertilizer Distributers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my manure-distributer, and Fig. 2 is a plan view thereof.

The nature of my invention consists in the construction and arrangement of a machine for distributing manure in furrows, as will be hereinafter more fully set forth.

In the annexed drawing, A represents a rectangular frame of any suitable dimensions, having boxes in which the axle $a$ is placed. On this frame are secured two parallel beams, B B, a suitable distance apart, and extending in front of the frame. On the inner sides of the beams B, at their front ends, are fastened the hounds, between which the tongue D is pivoted. Between the hounds, below the rear end of the tongue, is pivoted the front end of a plow-beam, E, to which is attached in the usual manner a standard or foot with plow G, and a colter, H. Above the main frame A is a manure-box, I, supported upon suitable corner-posts, and on the front side of this box is a rocking shaft, J, provided with an arm, $b$, which is connected by a chain, $d$, with the rear end of the plow above mentioned. At one end of the rocking-shaft J is a lever, K, by means of which the shaft is turned, so as to raise and lower the plow as required, the lever being held by means of a chain, $e$, adjusted on a hook in the side of the box. In going to and from the field the plow is lifted entirely out of the ground by turning the lever K backward, and fastening the same under a catch, $f$, as shown.

From the center of the bottom of the box I extends a vertical chute, L, downward to and between the beams B B. In this chute is pivoted a wing, M, adjusted at any angle desired by means of a chain, $h$, at top, for the purpose of regulating the amout of manure to be distributed.

Within the frame A, at each side on the axle $a$, is placed a roller, N, forming the wheels on which the machine moves. Between these wheels, on the axle, is placed a spiked cylinder, C, having an elongated hub, as shown, said cylinder working between the beams B B, below the chute L. One end of the hub of this cylinder is connected with the adjoining wheel or roller N by means of an ordinary pawl, $i$, and ratchet $k$, so that the cylinder will be revolved with the roller while the machine is moving forward. The other end of the cylinder C is, by gears $m\ m$, conducted with a similar cylinder, C', having its bearing in the beams B B. These two cylinders distribute, after separating it, as it falls from the chute L, and a box or frame, P, suspended by rods $n$ from the main frame, prevents the manure from falling at the sides of the furrow, but confines it to the furrow made by the plow G in front.

Each spiked cylinder is cleaned from any adhering manure by means of a series of teeth, $s\ s$, working between the spikes, said teeth being secured to a rocking shaft, $p$, provided with an arm, $t$, operated by a spring, $v$, so that the teeth $s$ can yield to any hard substances that might be in the manure and get fastened in the spikes of the cylinders.

What I claim as new, and desire to secure by Letters Patent, is—

1. The combination of the spiked distributing-cylinders C C' operated as described, the suspended frame P, and the elevated manure-box I, with chute L, and adjustable wing M, substantially as described.

2. The combination of the rocking shaft $p$, teeth $s$, arm $t$, and spring $v$, arranged in connection with the spiked cylinder, as and for the purposes set forth.

In testimony that I claim the above, I have hereunto subscribed my name in the presence of two witnesses.

JOHN BAKER HENRY.

Witnesses:
WILLIAM M. RICE,
HUMPHRY RICE.